United States Patent
Callan

(10) Patent No.: US 6,336,290 B1
(45) Date of Patent: Jan. 8, 2002

(54) LAWN AND GARDEN EDGING SYSTEM

(76) Inventor: Terry P. Callan, 22 Turnpike Place, Langley Green, Crawley, West Sussex RH11 7UA (GB)

( * ) Notice: Subject to any disclaimer, the term of this patent is extended or adjusted under 35 U.S.C. 154(b) by 0 days.

(21) Appl. No.: 09/497,906

(22) Filed: Feb. 4, 2000

(51) Int. Cl.⁷ .................................................. H01G 1/00
(52) U.S. Cl. .............................. 47/33; 52/102; 52/604; 47/25
(58) Field of Search .......................... 47/33, 25; 52/102, 52/604, 606, 608

(56) References Cited

U.S. PATENT DOCUMENTS

| | | | |
|---|---|---|---|
| 2,662,342 A | | 12/1953 | Peterson |
| 3,520,082 A | * | 7/1970 | Smith .............................. 47/33 |
| 4,858,379 A | | 8/1989 | West |
| 5,067,273 A | | 11/1991 | Richwine |
| 5,092,076 A | * | 3/1992 | Terreta ........................... 47/33 |
| 5,535,545 A | | 7/1996 | Matz |
| D385,050 S | | 10/1997 | Gay |
| 5,715,628 A | | 2/1998 | Beladakis |

FOREIGN PATENT DOCUMENTS

CA 2048990 A * 2/1993

* cited by examiner

Primary Examiner—Charles T. Jordan
Assistant Examiner—Floris C. Copier

(57) ABSTRACT

A lawn and garden edging system for edging a lawn with interconnected pieces which can be lengthened and shortened. The lawn and garden edging system includes a first strip for inserting into a ground surface and a second strip for inserting into the first strip. The first strip is elongate and has a top side, a front side, a back side, a bottom side and two ends. A plurality of bores are located in the top side of the first strip. A plurality of first spikes for inserting into the ground surface are coupled to the bottom side of the first strip. The second strip is elongate. The second strip has a cross-section traverse to a longitudinal axis of the second strip has a generally L shape. The second strip has a short wall and long wall. A plurality of second spikes for insertion into the bores in the top wall of the first strip are coupled to and extend away from the short wall of the second strip. The spikes are oriented generally perpendicular to a plane of the long wall of the second strip.

11 Claims, 2 Drawing Sheets

LAWN AND GARDEN EDGING SYSTEM

BACKGROUND OF THE INVENTION

1. Field of the Invention

The present invention relates to edging systems and more particularly pertains to a new lawn and garden edging system for edging a lawn with interconnected pieces which can be lengthened and shortened.

2. Description of the Prior Art

The use of edging systems is known in the prior art. More specifically, edging systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,662,342; 5,067,273; 4,858,379; 5,715,628; U.S. Pat. Des. No. 385,050; and U.S. Pat. No. 5,535,545.

While these devices fulfill their respective, particular objectives and requirements, the aforementioned patents do not disclose a new lawn and garden edging system. The inventive device includes a first strip for inserting into a ground surface and a second strip for inserting into the first strip. The first strip is elongate and has a top side, a front side, a back side, a bottom side and two ends. A plurality of bores are located in the top side of the first strip. A plurality of first spikes for inserting into the ground surface are coupled to the bottom side of the first strip. The second strip is elongate. The second strip has a cross-section traverse to a longitudinal axis of the second strip has a generally L shape. The second strip has a short wall and long wall. A plurality of second spikes for insertion into the bores in the top wall of the first strip are coupled to and extend away from the short wall of the second strip. The spikes are oriented generally perpendicular to a plane of the long wall of the second strip.

In these respects, the lawn and garden edging system according to the present invention substantially departs from the conventional concepts and designs of the prior art, and in so doing provides an apparatus primarily developed for the purpose of edging a lawn with interconnected pieces which can be lengthened and shortened.

SUMMARY OF THE INVENTION

In view of the foregoing disadvantages inherent in the known types of edging systems now present in the prior art, the present invention provides a new lawn and garden edging system construction wherein the same can be utilized for edging a lawn with interconnected pieces which can be lengthened and shortened.

The general purpose of the present invention, which will be described subsequently in greater detail, is to provide a new lawn and garden edging system apparatus and method which has many of the advantages of the edging systems mentioned heretofore and many novel features that result in a new lawn and garden edging system which is not anticipated, rendered obvious, suggested, or even implied by any of the prior art edging systems, either alone or in any combination thereof.

To attain this, the present invention generally comprises a first strip for inserting into a ground surface and a second strip for inserting into the first strip. The first strip is elongate and has a top side, a front side, a back side, a bottom side and two ends. A plurality of bores are located in the top side of the first strip. A plurality of first spikes for inserting into the ground surface are coupled to the bottom side of the first strip. The second strip is elongate. The second strip has a cross-section traverse to a longitudinal axis of the second strip has a generally L shape. The second strip has a short wall and long wall. A plurality of second spikes for insertion into the bores in the top wall of the first strip are coupled to and extend away from the short wall of the second strip. The spikes are oriented generally perpendicular to a plane of the long wall of the second strip.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawn and garden edging system apparatus and method which has many of the advantages of the edging systems mentioned heretofore and many novel features that result in a new lawn and garden edging system which is not anticipated, rendered obvious, suggested, or even implied by any of the prior art edging systems, either alone or in any combination thereof.

It is another object of the present invention to provide a new lawn and garden edging system which may be easily and efficiently manufactured and marketed.

It is a further object of the present invention to provide a new lawn and garden edging system which is of a durable and reliable construction.

An even further object of the present invention is to provide a new lawn and garden edging system which is susceptible of a low cost of manufacture with regard to both materials and labor, and which accordingly is then susceptible of low prices of sale to the consuming public, thereby making such lawn and garden edging system economically available to the buying public.

Still yet another object of the present invention is to provide a new lawn and garden edging system which provides in the apparatuses and methods of the prior art some of the advantages thereof, while simultaneously overcoming some of the disadvantages normally associated therewith.

Still another object of the present invention is to provide a new lawn and garden edging system for edging a lawn with interconnected pieces which can be lengthened and shortened.

Yet another object of the present invention is to provide a new lawn and garden edging system which includes a first strip for inserting into a ground surface and a second strip for inserting into the first strip. The first strip is elongate and has a top side, a front side, a back side, a bottom side and two ends. A plurality of bores are located in the top side of the first strip. A plurality of first spikes for inserting into the ground surface are coupled to the bottom side of the first strip. The second strip is elongate. The second strip has a cross-section traverse to a longitudinal axis of the second strip has a generally L shape. The second strip has a short wall and long wall. A plurality of second spikes for insertion into the bores in the top wall of the first strip are coupled to and extend away from the short wall of the second strip. The spikes are oriented generally perpendicular to a plane of the long wall of the second strip.

Still yet another object of the present invention is to provide a new lawn and garden edging system that has as second strip having a horizontal portion thereon which will cover the edge of a lawn and prevent growth along that edge.

Even still another object of the present invention is to provide a new lawn and garden edging system that can be easily installed with minimal effort.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
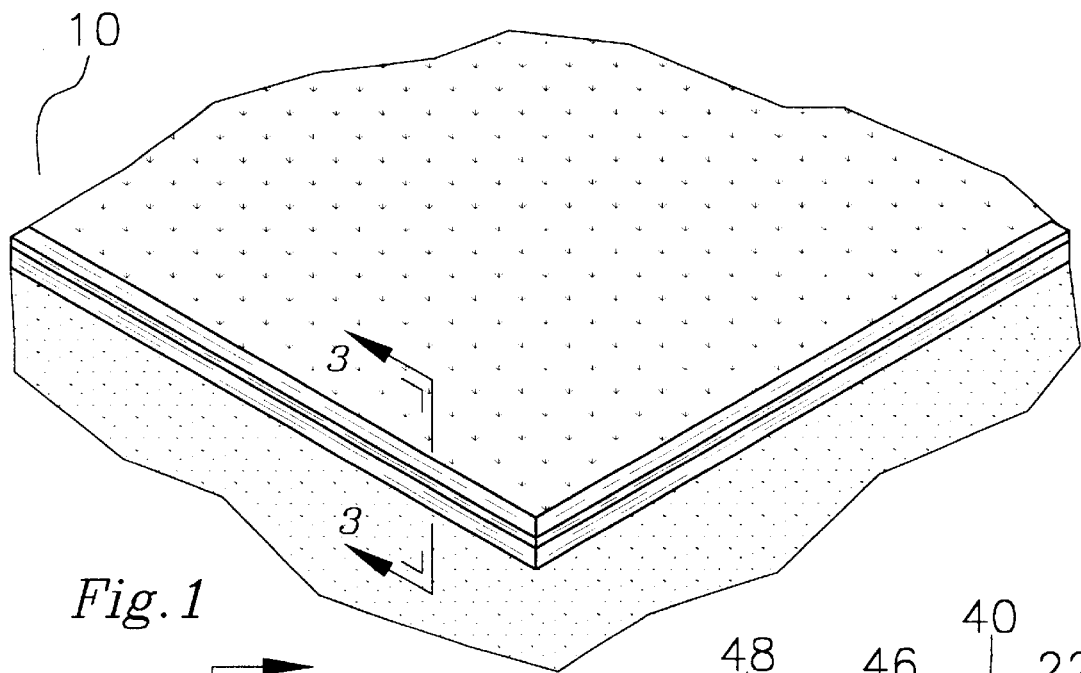
FIG. 1 is a schematic perspective view of a new lawn and garden edging system according to the present invention.
Figure 2:
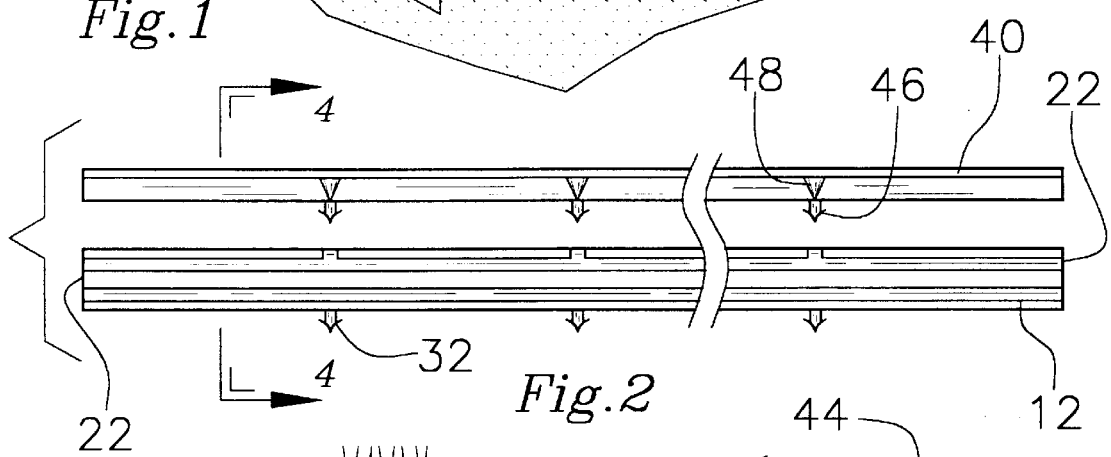
FIG. 2 is a schematic front view of the present invention.
Figure 3:
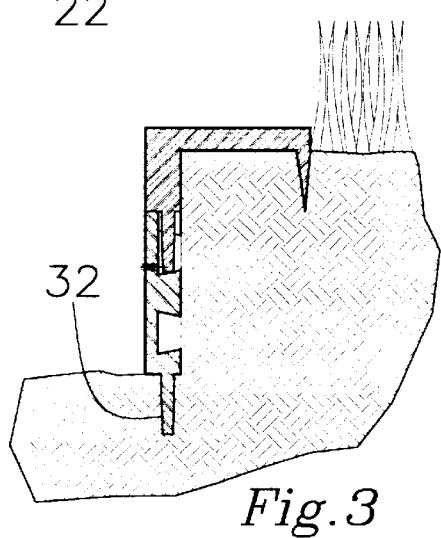
FIG. 3 is a schematic side view of the present invention and the lawn taken along line 3—3.
Figure 4:
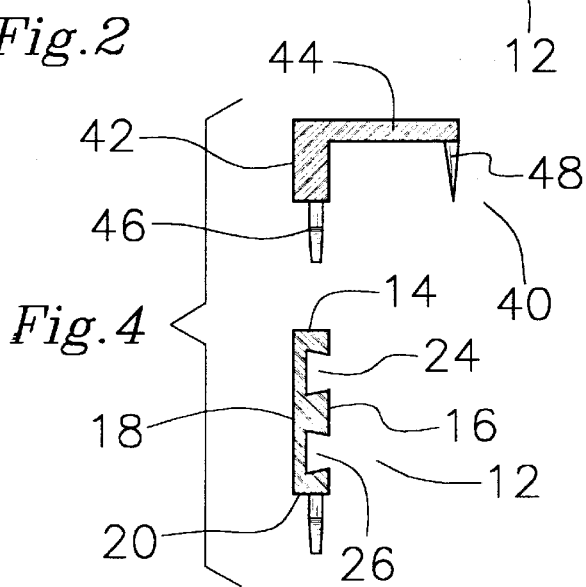
FIG. 4 is a schematic cross-sectional view taken along line 4—4 of the present invention.
Figure 5:
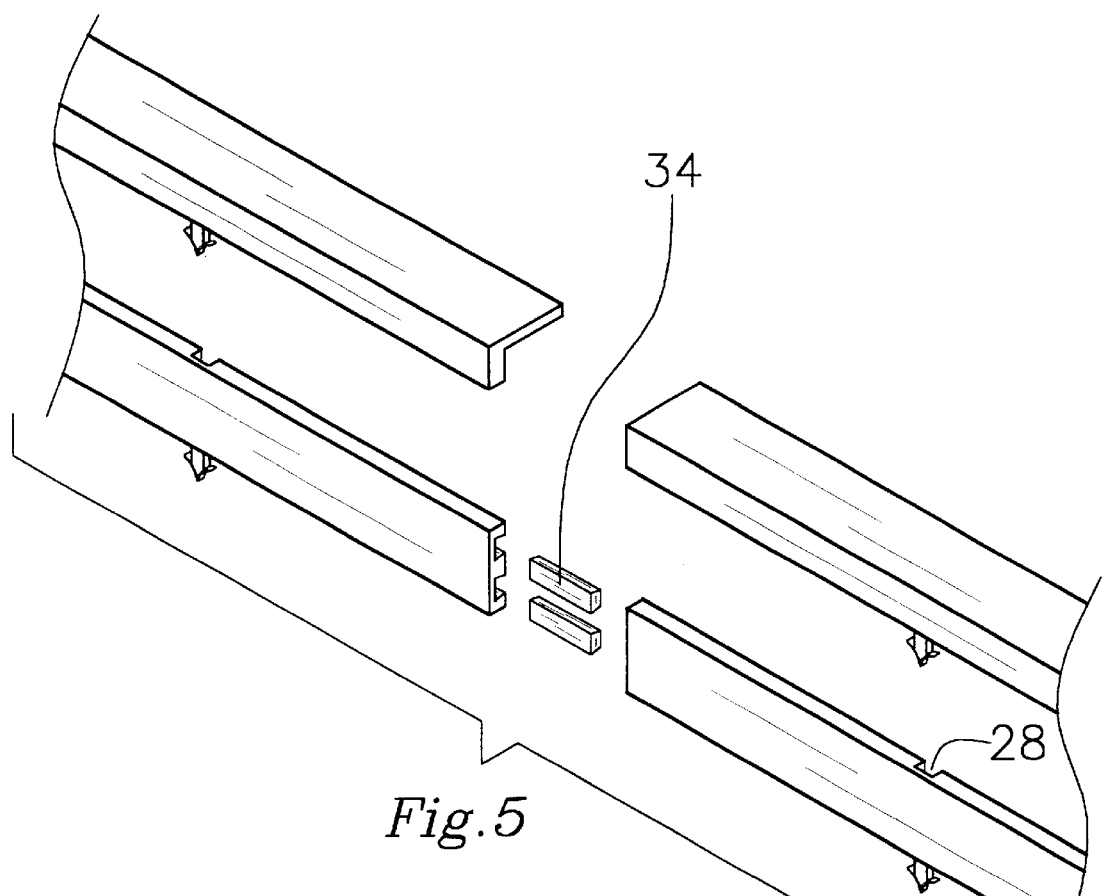
FIG. 5 is a schematic perspective view of the rods and strips of the present invention.
Figure 6:
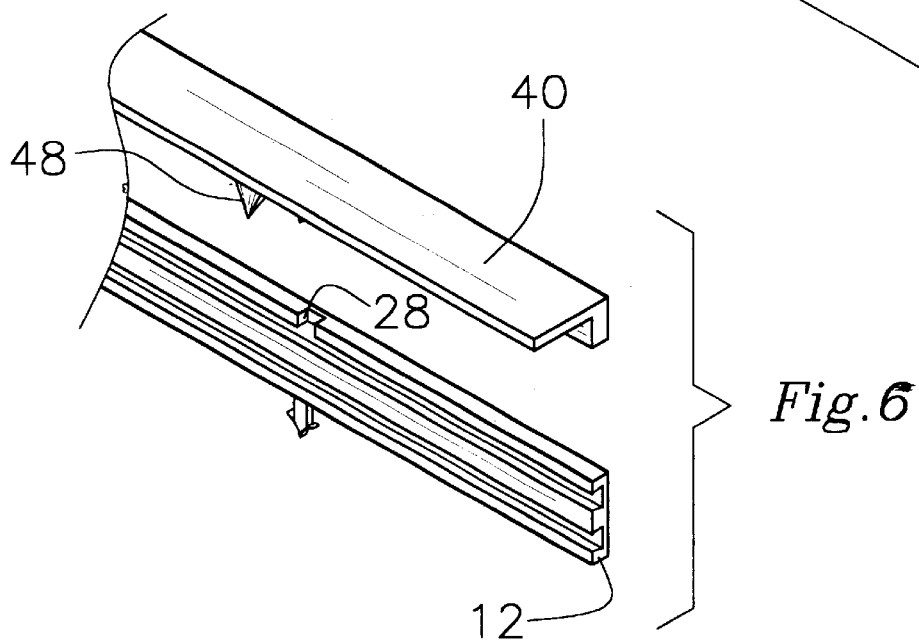
FIG. 6 is a schematic perspective view of the present invention.

With reference now to the drawings, and in particular to FIGS. 1 through 6 thereof, a new lawn and garden edging system embodying the principles and concepts of the present invention and generally designated by the reference numeral 10 will be described.

As best illustrated in FIGS. 1 through 6, the lawn and garden edging system 10 generally comprises a first strip 12 for inserting into a ground surface and a second strip 40 for inserting into the first strip whereby the second strip is oriented above the first strip. Preferably the strips are formed from plastic. The first strip 12 is elongate and has top side 14, a front side 16, a back side 18, a bottom side 20 and two ends 22. Preferably, a cross-section of the first strip 12 taken in a plane oriented generally perpendicular to a longitudinal axis of the strip is generally rectangular shaped. Ideally, a height of the front side 16 is at least about three times greater than a width of the top side 14.

Preferably, a first 24 and a second 26 elongate slot are formed in the first strip. The slots need only be at the ends of the first strip, however, it is preferred that the slots 24, 26 extend from one of the ends 22 of the first strip to the other of the ends of the strip. The slots extend generally parallel to the longitudinal axis. The first slot 24 is adjacent to the top side 14 of the strip and the second slot 26 is adjacent to the bottom side 20 of the first strip.

A plurality of bores 28 are located in the top side 14 of the first strip 12. Each of the bores extends into the first slot 24.

Preferably, a plurality of first spikes 32 for inserting into the ground surface are coupled to the bottom side 20 of the first strip 12. Each of the spikes 32 extending away from the top side 14 of the first strip 12.

A plurality of connecting rods 34 has a shape adapted to fit in one of the slots 24,26 for being located therein. The first strip 12 can be connected to another one of the first strips by placing the ends 22 of the first strips adjacent to each other and inserting a portion of the connecting rod 34 in one of the slots of each of the adjacent first strips to form a juncture of the first strips.

A second strip 40 connects to the first strip. The second strip is elongate. The second strip 40 preferably has a cross-section traverse to a longitudinal axis of the second strip having a L shape. The second strip has a short wall 42 and long wall 44. The short wall 42 is generally perpendicular to the long wall 44.

A plurality of second spikes 46 for insertion into the bores 28 in the top wall of the first strip 12 are coupled to and extend away from the short wall 42 of the second strip 40. The spikes 46 are oriented generally perpendicular to a plane of the long wall 44 of the second strip 40.

A plurality of third spikes 48 for insertion into the ground surface are coupled to and extend away from the long wall 44 of the second strip. The third spikes are oriented generally perpendicular to the plane of the long wall 44 of the second strip 40.

In use, the first strip 12 is inserted into the ground surface with the first spikes 32 facing downward to secure the first strip 12 in the soil. If the area to be bounded is large, multiple first strips can be releasably coupled together using rods 34 which are inserted into the slots 24, 26 of adjacent first strips. The second strip 40 is placed over the first strip 12 such that the second spikes 46 are inserted into the bores 28 of the first strip 12. The third spikes 48 are then pressed into the ground surface to form a periphery around the lawn.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawn edging system, comprising:
   a first strip for inserting into a ground surface, said first strip being elongate, said first strip having a top side, a front side, a back side, a bottom side and two ends;
   wherein said back side of said first strip has a continuous surface between said ends;
   a plurality of bores, each of said bores being located in said top side of said first strip;
   a plurality of first spikes for inserting into said ground surface, each of said first spikes being coupled to said bottom side of said first strip;
   wherein each of said first spikes extends away from said top side of said first strip;
   a second strip for connecting to said first strip, said second strip being elongate, said second strip having a cross-section traverse to a longitudinal axis of said second strip having a generally L shape, said second strip having a short wall extending between a pair of ends and a long wall extending between a pair of ends;
   wherein said short wall and said long wall are each continuous between respective said pair of ends;
   a plurality of second spikes for insertion into said bores in said top wall of said first strip, each of said second spikes being coupled to and extending away from said short wall of said second strip, said spikes being oriented generally perpendicular to a plane of said long wall of said second strip;
   a plurality of third spikes for insertion into said ground surface, said third spikes being coupled to and extending away from said long wall of said second strip, said third spikes being oriented generally perpendicular to said plane of said long wall of said second strip.

2. The lawn edging system as in claim 1, further comprising:
   wherein a cross-section of the first strip taken in a plane oriented generally perpendicular to a longitudinal axis of said strip is generally rectangular shaped, wherein a height of said front side is at least about three times greater than a width of said top side; and
   at least one elongate slot formed in said first strip, wherein said slot extends from one of said ends of said first strip to the other of said ends of said strip, said slot extending generally parallel to said longitudinal axis.

3. The lawn edging system as in claim 2, further comprising:
   a second slot, said second slot extending parallel to said first slot, said first slot being adjacent to said top side of said strip, said second slot being adjacent to said bottom side of said first strip.

4. The lawn edging system as in claim 2, further including:
   a plurality of connecting rods, each of said rods having a shape adapted to fit in said slot for being located therein, wherein said first strip can be connected to another one of said first strips by placing said ends of said first strips adjacent to each other and inserting a portion of said connecting rod in one of said slots of each of said adjacent first strips to form a juncture of said first strips.

5. A lawn edging system, comprising:
   a first strip for inserting into a ground surface, said first strip being elongate, said first strip having a top side, a front side, a back side, a bottom side and two ends, wherein a cross-section of the first strip taken in a plane oriented generally perpendicular to a longitudinal axis of said strip is generally rectangular shaped, wherein a height of said front side is at least about three times greater than a width of said top side;
   wherein said back side of said first strip has a continuous surface between said ends;
   a first and a second elongate slot formed in said first strip, wherein said slots extend from one of said ends of said first strip to the other of said ends of said strip, said slots extending generally parallel to said longitudinal axis, said first slot being adjacent to said top side of said strip, said second slot being adjacent to said bottom side of said first strip;
   a plurality of bores, each of said bores being located in said top side of said first strip, each of said bores extending into said first slot;
   a plurality of first spikes for inserting into said ground surface, each of said spikes being coupled to said bottom side of said first strip, each of said spikes extending away from said top side of said first strip;
   a plurality of connecting rods, each of said rods having a shape adapted to fit in one of said slots for being located therein, wherein said first strip can be connected to another one of said first strips by placing said ends of said first strips adjacent to each other and inserting a portion of said connecting rod in one of said slots of each of said adjacent first strips to form a juncture of said first strips;
   a second strip for connecting to said first strip, said second strip being elongate, said second strip having a cross-section traverse to a longitudinal axis of said second strip having a generally L shape, said second strip having a short wall extending between a pair of ends and a long wall perpendicular to said short wall and extending between a pair of ends, wherein said short wall and said long wall are each continuous on one plane between respective said pair of ends, said short wall being generally perpendicular to said long wall;
   a plurality of second spikes for insertion into said bores in said top wall of said first strip, each of said second spikes being coupled to and extending away from said short wall of said second strip, said spikes being oriented generally perpendicular to a plane of said long wall of said second strip; and
   a plurality of third spikes for insertion into said ground surface, said third spikes being coupled to and extending away from said long wall of said second strip, said third spikes being oriented generally perpendicular to said plane of said long wall of said second strip.

6. A lawn edging system, comprising:

an elongate wall strip for forming a vertical wall surface, said wall strip having a top side, a front side, a back side, a bottom side and opposite ends, said wall strip having a plurality of longitudinally-spaced bores formed in said top side of said wall strip, said wall strip having a plurality of longitudinally-spaced first spikes formed on said bottom side thereof, said first spikes of said wall strip being insertable into a plurality of bores of another of said wall strips to secure said wall strips together, said first spikes having a free end with a width tapered toward said free end such that said spikes are penetrable into a ground surface, said first spikes lying in a plane generally oriented parallel to a plane of said front side of said wall strip; and an elongate cap strip for forming horizontal surface, said cap strip being connectable to said wall strip, said cap strip having opposite ends, said cap strip having a cross-section traverse to a longitudinal axis of said cap strip with a generally L shape, said cap strip having a short wall portion extending between a pair of ends and a long wall portion perpendicular to said short wall portion and extending between a pair of ends, said short wall portion and said long wall portion of said cap strip being continuous on one plane between said ends of said cap strip, said cap strip having a plurality of second spikes insertable into said bores in said top wall of said wall strip, each of said second spikes being mounted on and extending away from said short wall portion of said cap strip, said second spikes being oriented substantially parallel to a plane of said short wall portion and substantially perpendicular to a plane of said long wall portion of said cap strip, said cap strip having a plurality of third spikes for penetration into the ground surface, said third spikes being mounted on and extending away from said long wall portion of said cap strip, said third spikes extending in a plane oriented substantially perpendicular to said plane of said long wall portion of said cap strip.

7. The lawn edging system as in claim 6, wherein said second spikes extend in a line between said ends of said cap strip and said third spikes extend in a line between said ends of said cap strip, said line of second spikes being laterally spaced from said line of third spikes for insertion into the ground surface at locations spaced from said wall strip when said cap strip is mounted on said wall strip.

8. The lawn edging system as in claim 6, wherein a cross-section of said wall strip taken in a plane oriented generally perpendicular to a longitudinal axis of said wall strip is generally rectangular shaped.

9. The lawn edging system as in claim 6, additionally comprising a first slot formed in said wall strip, said first slot extending between said ends of said wall strip and extending generally parallel to said longitudinal axis of said wall strip.

10. The lawn edging system as in claim 9, further including a plurality of connecting rods, each of said rods having a shape adapted to fit in said first slot such that said connecting rods can connect a pair of said wall strips in an end to end orientation.

11. The lawn edging system as in claim 9, wherein a second slot extends substantially parallel to said first slot, said first slot being located adjacent to said top side of said wall strip, said second slot being adjacent to said bottom side of said wall strip.

* * * * *